United States Patent [19]

Kinney, Jr. et al.

[11] Patent Number: 4,481,021
[45] Date of Patent: Nov. 6, 1984

[54] ROTARY DRUM AIR FILTER

[75] Inventors: William L. Kinney, Jr.; Richard E. Evans, Jr., both of Charlotte, N.C.

[73] Assignee: United Air Filter Company, Charlotte, N.C.

[21] Appl. No.: 459,472

[22] Filed: Jan. 20, 1983

[51] Int. Cl.³ .................... B01D 46/04; B01D 46/26
[52] U.S. Cl. ........................ 55/290; 55/294; 55/351; 55/353; 210/402
[58] Field of Search ............... 55/285, 289, 290, 294, 55/302, 351, 353; 210/396, 402; 248/665, 667; 165/89; 209/300, 303, 305, 406, 473

[56] References Cited

U.S. PATENT DOCUMENTS

| | | | |
|---|---|---|---|
| 576,878 | 2/1897 | Mitchell | 55/285 |
| 1,276,601 | 8/1918 | Whiting | 248/667 |
| 2,398,233 | 4/1946 | Lincoln | 55/290 |
| 2,718,933 | 9/1955 | Norbom . | |
| 3,198,460 | 8/1965 | Goettl | 248/665 |
| 3,345,805 | 10/1967 | Sherrill | 55/290 |
| 3,472,002 | 10/1969 | Brown et al. | 55/290 |
| 3,606,735 | 9/1971 | Baigas, Jr. . | |
| 4,222,754 | 9/1980 | Horvat | 55/290 |

FOREIGN PATENT DOCUMENTS

| | | | |
|---|---|---|---|
| 197809 | 9/1978 | Fed. Rep. of Germany | 210/402 |
| 614045 | 12/1948 | United Kingdom | 55/290 |

*Primary Examiner*—David Lacey
*Attorney, Agent, or Firm*—Bell, Seltzer, Park & Gibson

[57] ABSTRACT

An air filter comprising a rotatably mounted drum assembly having a generally cylindrically shaped skeletal framework, with a plurality of side-by-side substantially circular filter media support members projecting radially outwardly from and supported by the cylindrical framework and with each of the circular support members being of modular construction, and wherein each of the circular support members has opposing sloping sides thereof arranged in radially outwardly converging relationship with a band of pliable filter media secured to and overlying the circular support members for rotative movement therewith. Suction apparatus in the form of a plurality of stationary nozzles extend in the valleys between adjacent circular support members for effecting removal of the collected waste from the filter media.

11 Claims, 11 Drawing Figures

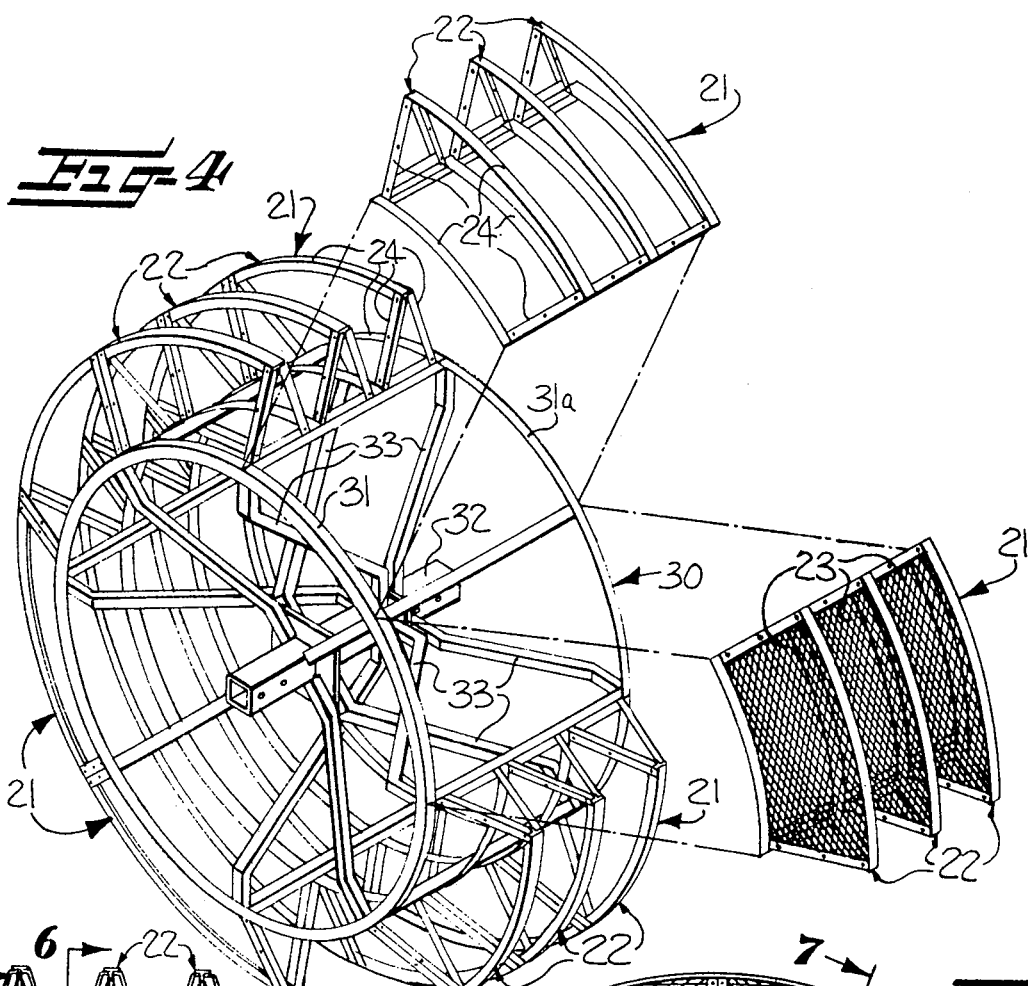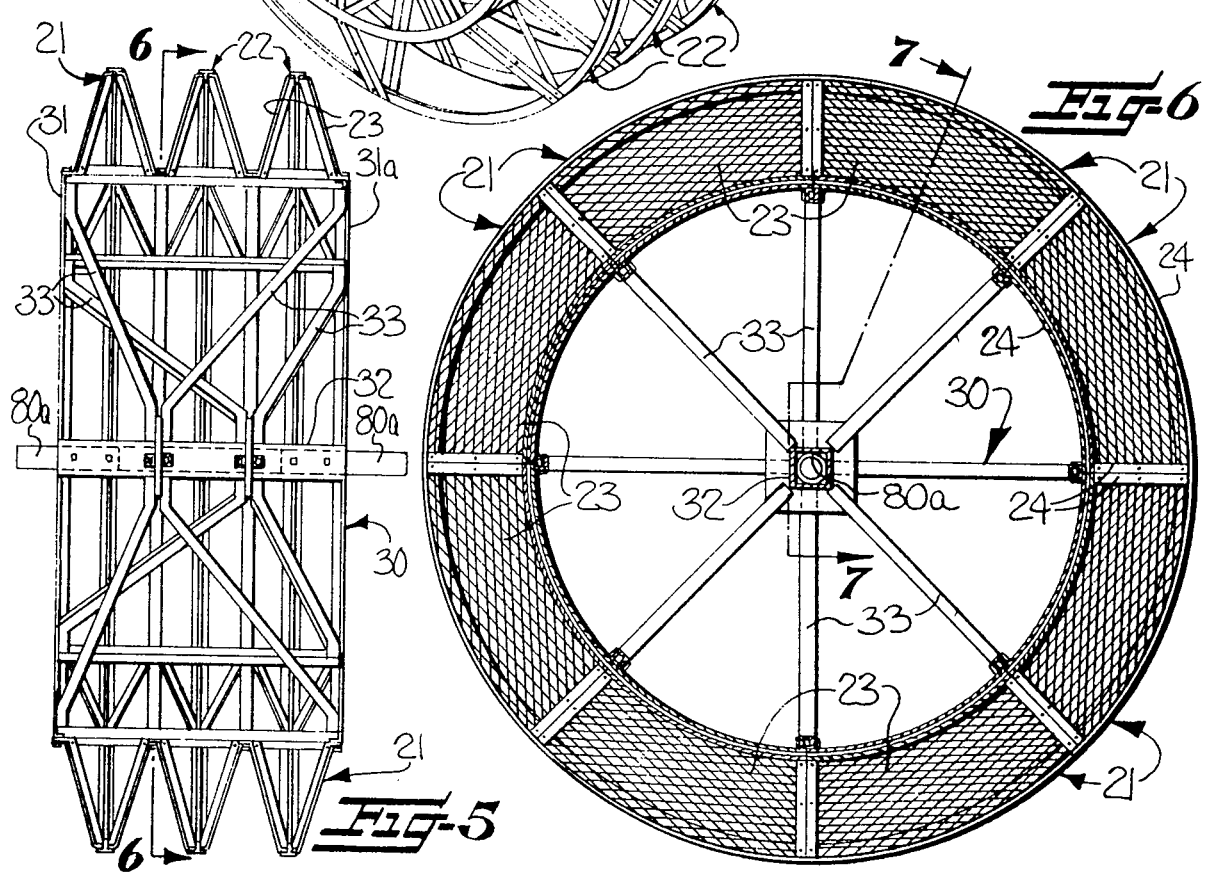

ROTARY DRUM AIR FILTER

This invention relates to air filters of the rotary drum type wherein air to be cleaned is moved into contact with and through the exterior surface of the rotary drum and then interiorly of the drum, and from where the air is typically recirculated in the plant or building.

In recent years it is become increasingly important to increase the filter capacity of a system in order to effect better cleaning of the air and to meet increasingly stringent government standards. With this in mind, it has brought to the forefront the need for a compact rotary filter with increased air filtering capacity. This invention provides such a compact filter with increased air filtering capacity by providing an increased surface area on the rotary drum by providing an undulating peripheral surface with peaks and valleys. This is accomplished by the rotary drum being formed of a plurality of side-by-side substantially circular filter media support members, which project radially outwardly from and are supported by an underlying cylindrical framework, and wherein each of the circular support members has opposing sloping sides arranged in radially outwardly converging relationship. Thus, filter media placed on such supporting surface serves for substantially increasing the surface area for filtration of the air.

It is an important feature of this invention to provide a rotary drum filter which is of modular construction. This modular construction utilizes a plurality of arcuate support segments adapted to be circularly arranged for forming the circular support members to thus facilitate forming the rotary drum filter of the desired size and length.

It is also a feature of this invention to provide in a rotary drum filter of the type described a suction cleaning device stationarily positioned and wherein a plurality of nozzles extend into the valleys of the rotary drum filter for effecting removal of the collected waste from the filter media on the drum.

Some of the objects and advantages of the invention having been stated, other objects and advantages will appear as the description proceeds, when taken in conjunction with the accompanying drawings in which:

FIG. 4 is a partially exploded perspective view of one-half of the rotary drum filter of FIG. 1 with the filter media removed from the surface thereof;

FIG. 5 is a cross-sectional view through the filter drum with the media removed;

FIG. 6 is another sectional view taken along line 6—6 of FIG. 5;

Figure 1:
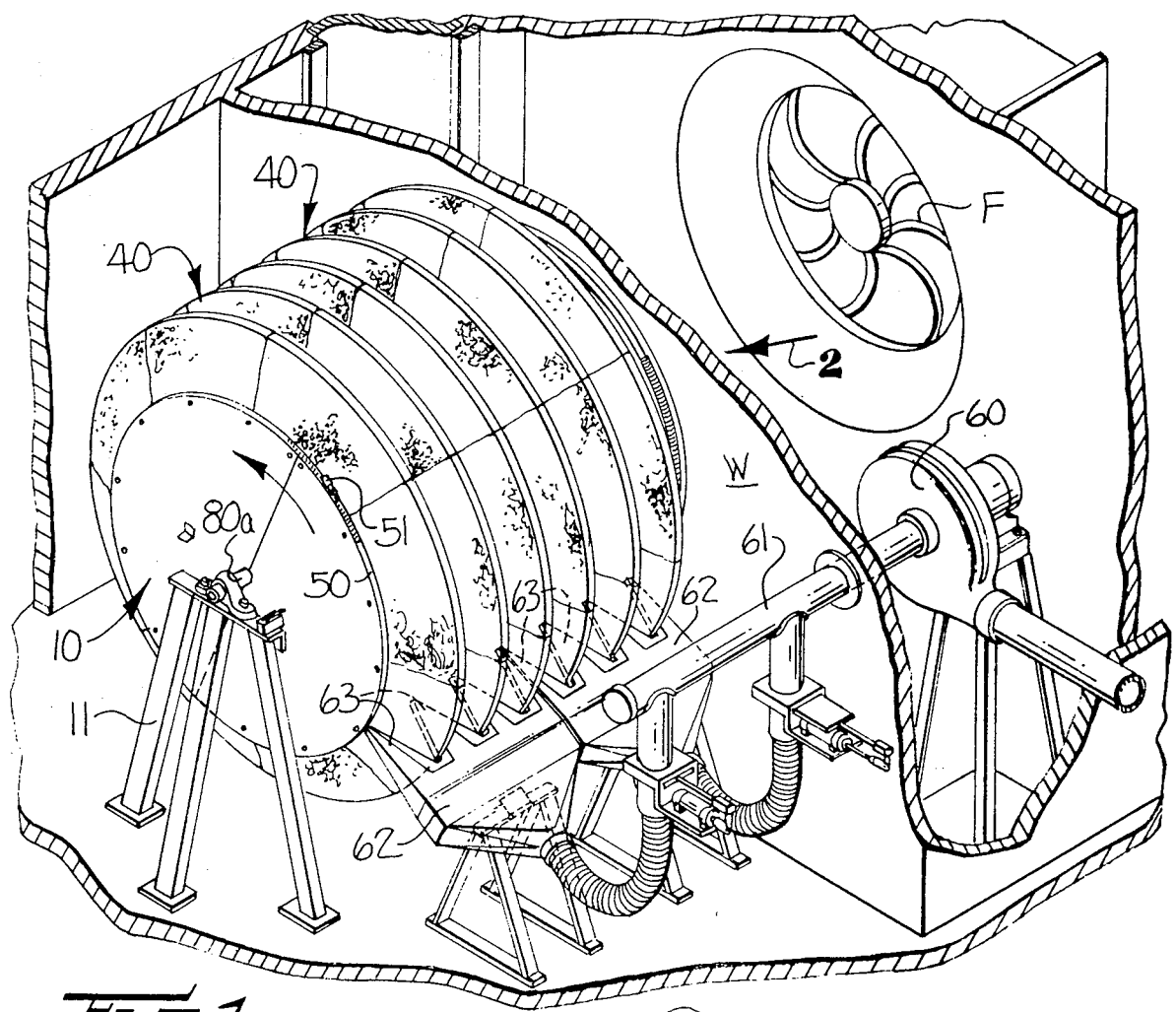
FIG. 1 is a perspective view of the rotary drum filter assembly in a typical type of installation.

Referring now to the drawings, reference numeral 10 broadly designates the air filter drum assembly which is illustrated as being supportingly mounted by a pair of end standards 11 and 11a. As illustrated, the standard 11a is positioned on the opposite side of a wall W from the other standard 11 so that one end of the filter drum extends through an opening in the wall. A suction fan F suitably provided adjacent the wall W serves for causing air to be moved into engagement with the surface of the rotary drum and through the interior thereof for effecting the desired filtration of the air.

Figure 2:
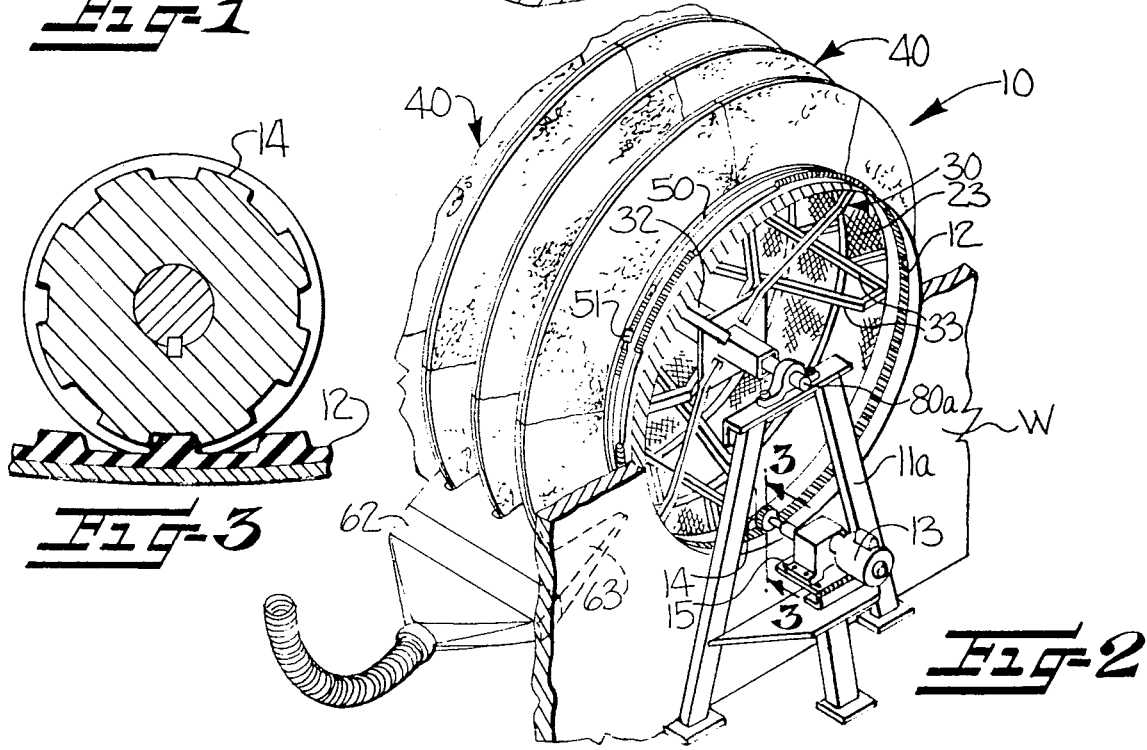
FIG. 2 is a fragmentary perspective view taken generally looking in the direction of arrow 2 of FIG. 1.
Figure 3:
FIG. 3 is an enlarged fragmentary view of the drive arrangement for the rotary drum taken substantially along line 3—3 of FIG. 2.
Figure 8:
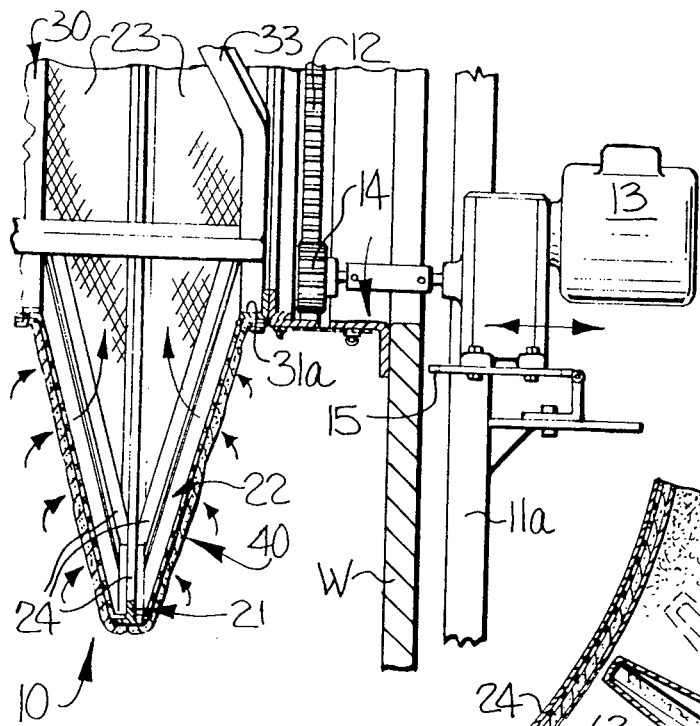
FIG. 8 is a fragmentary view of the drive means alongside one end of the rotary filter drum.

For imparting rotation to the filter drum assembly 10, an internal ring gear 12 is provided on the open end of the filter drum as best seen in FIG. 2. A motive drive means 13 is suitably supported from end support 11a and has a pinion gear 14 cooperating with the ring gear 12 for imparting the desired rotation to the filter drum. As best seen in FIG. 8, a pivoted plate 15 suitably supports the motive means 13 so that the weight of the motive means 13 serves for yieldably maintaining the pinion gear 14 in contact with the ring gear 12.

Referring now particularly to FIGS. 4 and 6, the construction of filter media supporting modular units 21 is shown wherein each modular unit comprises a plurality of interconnected side-by-side arcuate support segments 22 each having sloping opposite sides arranged in radially outwardly converging relationship. As illustrated, each modular unit 21 has three arcuate support segments 22, with eight modular units shown being circularly arranged so as to collectively define a plurality of side-by-side substantially circular support members projecting radially outwardly. The modular units 21 are interconnected as by welding or the like. Each of the modular units 21 has the main portion thereof defined by perforated material such as screen wire 23, which has the inner and outer peripheral portions thereof secured by a surrounding framework 24, the framework 24 thus serving to provide the desired rigidity to the modular units.

To mountingly support each of the modular units 21 a skeletal framework 30 of generally cylindrical form is provided to which the modular units are secured. As shown, this cylindrical framework 30 broadly takes the form of a pair of spaced annular members 31 and 31a suitably interconnected with each other by a hollow shaft 32 and a plurality of radial spoke members 33 interconnecting the shaft 32 with the circular annular members 31, 31a.

Figure 7:
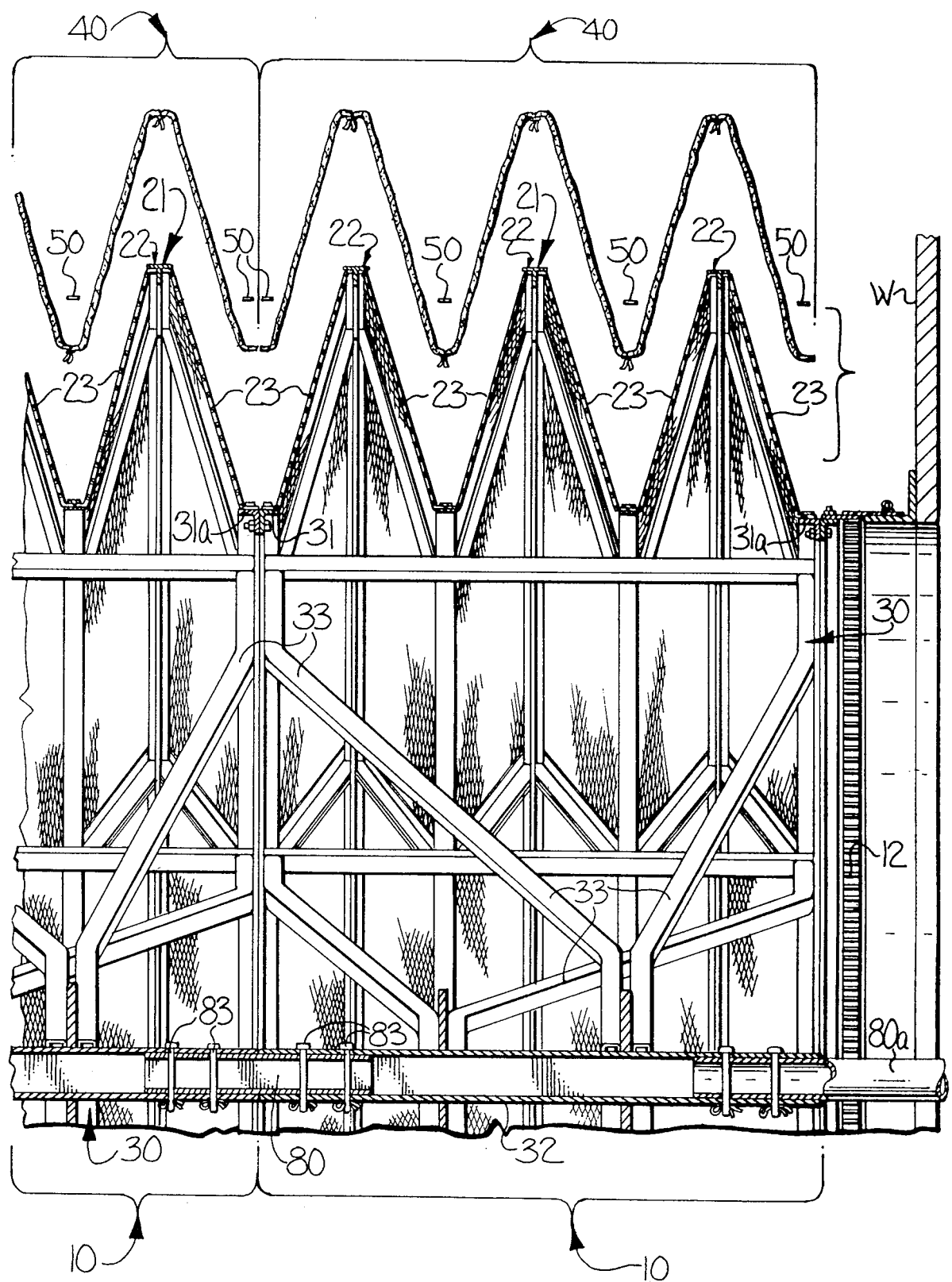
FIG. 7 is an enlarged partially exploded view taken along line 7—7 of FIG. 6.
Figure 10:
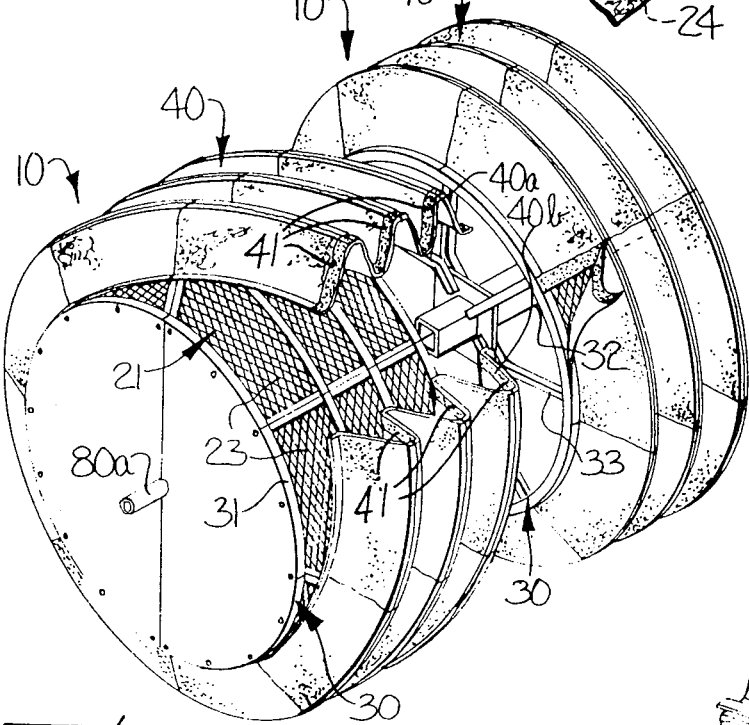
FIG. 10 is a partially exploded perspective view illustrating the manner in which the bands of pliable filter media are positioned in surrounding relation to the circular support members.
Figure 11:
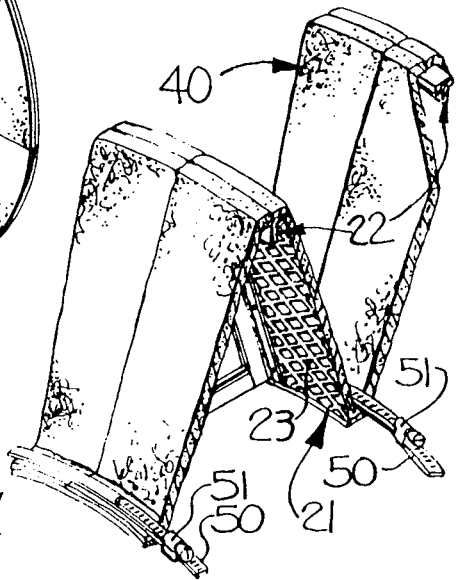
FIG. 11 is a fragmentary view illustrating the manner in which the filter media may be secured by engaging circular bands in the valley portions of the drum.

Referring now to FIGS. 7 and 10 in particular, it will be noted that an annular band of filter media 40 is provided for covering the circular support members, the annular band having overlapping end portions 40a and 40b desirably having attached thereto suitable strips 41 of Velcro material for effecting fastening of the overlapping end portions to each other. To further secure the filter media 40 on the circular support members, annular retaining bands 50 are provided for engaging the filter media in the valley portions thereof (FIG. 11). These retaining bands 50 are provided with suitable adjustment means 51 for effecting the desired tautness thereof.

In order to effectively clean the filter media 40, suction means is provided. As illustrated in FIG. 1, the suction means may take the form of a suitable blower 60 having a conduit 61 communicatively connecting a pair of manifold heads 62, each having a plurality of nozzles 63 carried thereby. The nozzles 63 are illustrated, are of tapered construction so as to be positioned within the valleys formed by the circular support members. Typically, the suction may be effective at all times, but may if desired be operable intermittently, dependent on the conditions of the air in the area that the rotary filter drum is to accommodate.

Figure 9:
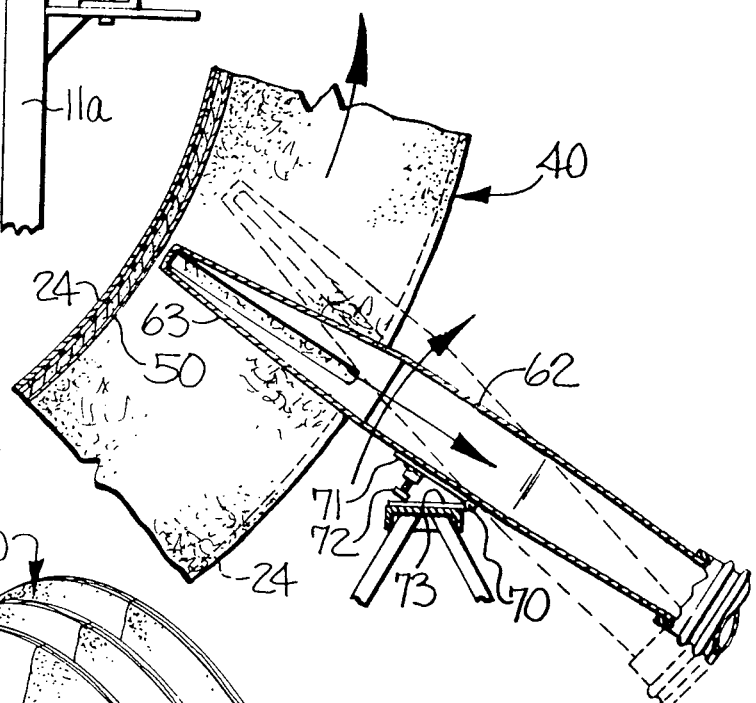
FIG. 9 is a fragmentary view of one of the suction nozzles and illustrating the yieldable mounting arrangement thereof.

As illustrated in FIG. 9, the suction nozzles are yieldably mounted so as to move away from the filter media 40 in the event that an obstruction is present on the surface of the filter media. This yieldable mounting is accomplished by providing a hinge type mounting means 70 with the nozzles 63 being mounted on an upper component 71 thereof. A suitable stop 72 extends downwardly from the hinge component 71 to rest against a lower hinge component 73. As illustrated in dotted lines in FIG. 9, in the event an obstruction is encountered the nozzles 63 will move upwardly so as to permit the obstruction to move underneath the free end of the nozzles and thus permit the nozzles to thereafter quickly return to its original position.

For facilitating the side-by-side arrangement of a plurality of assembled modular units as noted earlier, each assembled circular modular unit has its own hollow shaft 32. As illustrated in FIG. 7, an internal coupling shaft 80 is provided with opposite ends being received within the confines of the hollow shaft 32 of adjacent assembled modular units and suitably connected therewith by cross pins 83. In a similar manner the ends of the assembled modular units are provided with coupling shafts 80a mounted for rotation in the upstanding brackets 11 and 11a.

It will thus be seen that there has been provided a rotary drum air filter wherein the filter drum is of modular construction to facilitate providing the desired size filter drum for accommodating the environmental conditions of the area to be served.

In the drawings and specification there has been set forth a preferred embodiment of the invention and although specific terms are employed, they are used in a generic and descriptive sense only and not for purposes of limitation.

That which is claimed is:

1. A drum assembly adapted for being used as an air filter drum comprising a generally cylindrically shaped skeletal framework having an axis of rotation, a plurality of perforated filter media supporting modular units of arcuate shape supported by said cylindrical framework, said arcuate shaped modular units each comprising a plurality of side-by-side arcuate support segments, each segment having sloping opposite sides arranged in radially outwardly converging relationship, and said plurality of arcuate shaped modular units being circularly arranged so that the arcuate support segments thereof collectively define a plurality of side-by-side substantially circular support members with sloping sides projecting radially outwardly from and circumscribing said cylindrical framework and adapted to support filter media thereon.

2. An air filter drum assembly comprising a generally cylindrically shaped skeletal framework having an axis of rotation, a plurality of perforated filter media supporting modular units of arcuate shape supported by said cylindrical framework, said arcuate shaped modular units each comprising a plurality of side-by-side arcuate support segments, each segment having sloping opposing sides arranged in radially outwardly converging relationship, and said plurality of arcuate shaped modular units being circularly arranged so that the arcuate support segments thereof collectively define a plurality of side-by-side substantially circular filter media support members with sloping sides projecting radially outwardly from and circumscribing said cylindrical framework, and pliable filter media secured to and overlying said circular support members for rotative movement therewith.

3. An air filter drum assembly according to claim 2 wherein said pliable filter media is in the form of a circularly arranged band having opposite end portions thereof secured together in overlapping relationship, and said pliable filter media being concentrically arranged on said circular support members.

4. An air filter drum assembly according to claim 2 wherein said plurality of circularly arranged arcuate shaped modular units comprise first and second juxtaposed series of circularly arranged modular units, and wherein each series of circularly arranged modular units defines a plurality of said circular filter media support members, and wherein said pliable filter media comprises a concentrically arranged band of filter media for each of said series of circularly arranged modular units.

5. An air filter apparatus comprising a rotatively mounted drum assembly having a generally cylindrically shaped skeletal framework, a plurality of perforated filter media supporting modular units of arcuate shape supported by said cylindrical framework, said arcuate shaped modular units each comprising a plurality of side-by-side arcuate support segments, each segment having sloping opposing sides arranged in radially outwardly converging relationship, said plurality of modular units being circularly arranged so that the plurality of arcuate shaped support segments thereof collectively define a plurality of side-by-side substantially circular filter media support members with sloping sides projecting radially outwardly from and circumscribing said cylindrical framework, pliable filter media secured to and overlying said circular support members for rotative movement therewith, and suction means including a plurality of stationary nozzles each having tapered portions extending between said circular support members for removing collected waste from said filter media.

6. An air filter apparatus comprising a rotatively mounted drum assembly having a generally cylindrically shaped skeletal framework, a plurality of perforated filter media supporting modular units of arcuate shape supported by said cylindrical framework, said arcuate shaped modular units each comprising a plurality of side-by-side arcuate support segments, each segment having sloping opposing sides arranged in radially outwardly converging relationship, said plurality of modular units being circularly arranged so that the plurality of arcuate shaped support segments thereof collectively define a plurality of side-by-side substantially circular filter media support members with sloping sides projecting radially outwardly from and circumscribing said cylindrical framework, pliable filter media secured to and overlying said circular support members for rotative movement therewith, suction means including a plurality of stationary nozzles each having tapered portions extending between said circular support members for removing collected waste fraom said filter media, means defining a relatively large internal ring gear supported by one end of said drum assembly, and motive drive means mounted adjacent said drum assembly alongside said internal ring gear and offset from the axis of rotation of the drum assembly, said motive drive means including a relatively small gear extending within and meshing with said internal ring gear for imparting rotation to said filter drum assembly.

7. An air filter drum assembly comprising a generally cylindrically shaped skeletal framework having an axis of rotation, a plurality of side-by-side substantially circular support members supported by and projecting radially outwardly from and circumscribing said cylindrical framework, said circular support members being formed of circularly arranged arcuate shaped modular units each having a plurality of opposing sloping sides arranged in radially outwardly converging relationship, pliable filter media secured to and overlying said circular support members for rotative movement therewith, said pliable filter media being in the form of a circularly arranged band having opposite end portions thereof secured together in overlapping relationship, and said band of pliable filter media being concentrically arranged on said circular support members.

8. An air filter drum assembly comprising a rotatively mounted drum assembly having a plurality of juxtaposed generally cylindrically shaped skeletal frameworks each having a common axis of rotation, a first and second series of juxtaposed substantially circular support members, each series of support members being supported by and projecting radially outwardly from and circumscribing a respective one of said cylindrical frameworks, said circular support members of each series being formed of circularly arranged arcuate shaped modular units each having a plurality of opposing sloping sides arranged in radially outwardly converging relationship, and a respective band of filter media supportingly carried on each series of circular support members, each band of filter media having opposite end portions thereof secured together in overlapping relationship with the band of filter media being concentrically arranged on each of the series of circular support members.

9. An air filter apparatus comprising a rotatively mounted drum assembly having a generally cylindrically shaped skeletal framework, a plurality of side-by-side substantially circular filter media support members projecting radially outwardly from and supported by said cylindrical framework, said circular support members being formed of circularly arranged arcuate shaped modular units each having a plurality of opposing sloping sides arranged in radially outwardly converging relationship, side-by-side bands of pliable filter media secured to and overlying said circular support members for rotative movement therewith, said bands of filter media having opposite end portions thereof secured together in overlapping relationship, with the bands being concentrically arranged on said circular support members, and suction means including a plurality of stationary nozzles each having tapered portions extending between said circular support members for removing collected waste from said bands of filter media.

10. An air filter apparatus according to claim 9 including yieldable means mounting said nozzles so that in the event of an abutting obstruction being present on the surface of said filter media, the nozzles may yieldably move away from the filter media until the obstruction is passed and then quickly return therefrom.

11. An air filter apparatus according to claim 9 including means defining a relatively large internal ring gear supported by one end of said drum assembly, and motive drive means mounted adjacent said drum assembly alongside said internal ring gear and offset from the axis of rotation of the drum assembly, said motive drive means including a relatively small gear extending within and meshing with said internal ring gear for imparting rotation to said filter drum assembly, and yieldable means mounting said motive drive means for aiding in maintaining said small gear in meshing relation with said internal ring gear.

* * * * *